(12) United States Patent  (10) Patent No.: US 8,137,828 B2
Pierpont et al.  (45) Date of Patent: Mar. 20, 2012

(54) DURABLE FUEL CELL MEMBRANE ELECTRODE ASSEMBLY WITH COMBINED ADDITIVES

(75) Inventors: Daniel M. Pierpont, North Saint Paul, MN (US); Steven J. Hamrock, Stillwater, MN (US); Matthew H. Frey, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 85 days.

(21) Appl. No.: 12/342,370

(22) Filed: Dec. 23, 2008

(65) Prior Publication Data

US 2009/0169959 A1 Jul. 2, 2009

Related U.S. Application Data

(60) Provisional application No. 61/017,027, filed on Dec. 27, 2007.

(51) Int. Cl.
*H01M 8/10* (2006.01)

(52) U.S. Cl. ............... 429/33; 429/32; 429/40; 427/115

(58) Field of Classification Search .................... 429/33, 429/32, 40; 427/115
See application file for complete search history.

(56) References Cited

U.S. PATENT DOCUMENTS

| | | | |
|---|---|---|---|
| 4,358,545 A | 11/1982 | Ezzell et al. | |
| 4,417,969 A | 11/1983 | Ezzell et al. | |
| 6,624,328 B1 | 9/2003 | Guerra | |
| 6,790,554 B2 | 9/2004 | May et al. | |
| 7,348,088 B2 | 3/2008 | Hamrock et al. | |
| 2001/0021470 A1 | 9/2001 | May et al. | |
| 2004/0115515 A1 | 6/2004 | Ueda et al. | |
| 2004/0116742 A1 | 6/2004 | Guerra | |
| 2004/0121210 A1 | 6/2004 | Hamrock et al. | |
| 2006/0019140 A1* | 1/2006 | Kawazoe et al. | 429/33 |
| 2006/0063054 A1 | 3/2006 | Frey et al. | |
| 2006/0063055 A1 | 3/2006 | Frey et al. | |
| 2006/0099475 A1* | 5/2006 | Watanabe et al. | 429/33 |
| 2007/0065699 A1 | 3/2007 | Larson et al. | |
| 2007/0099052 A1 | 5/2007 | Frey et al. | |
| 2007/0099053 A1 | 5/2007 | Frey et al. | |
| 2008/0160380 A1 | 7/2008 | Hamrock | |
| 2009/0155662 A1* | 6/2009 | Durante et al. | 429/33 |

FOREIGN PATENT DOCUMENTS

| | | |
|---|---|---|
| EP | 0546714 A1 | 11/1992 |
| EP | 1414089 A1 | 4/2004 |
| EP | 1657772 A2 | 5/2006 |
| EP | 1912272 A1 | 4/2008 |
| JP | 2004-018573 * | 1/2004 |
| JP | 2004/197130 | 7/2004 |
| JP | 2004/327074 | 11/2004 |
| WO | WO 02/061871 A2 | 8/2002 |
| WO | WO 2007/007767 | 1/2007 |
| WO | WO-2009/086354 A1 * | 7/2009 |

* cited by examiner

*Primary Examiner* — Peter D. Mulcahy
*Assistant Examiner* — Henry Hu
(74) *Attorney, Agent, or Firm* — Philip Y. Dahl; Stephen L. Crooks

(57) ABSTRACT

A fuel cell membrane electrode assembly is provided comprising a polymer electrolyte membrane comprising a first polymer electrolyte and at least one manganese compound; and one or more electrode layers comprising a catalyst and at least one cerium compound. The membrane electrode assembly demonstrates an unexpected combination of durability and performance.

16 Claims, 1 Drawing Sheet

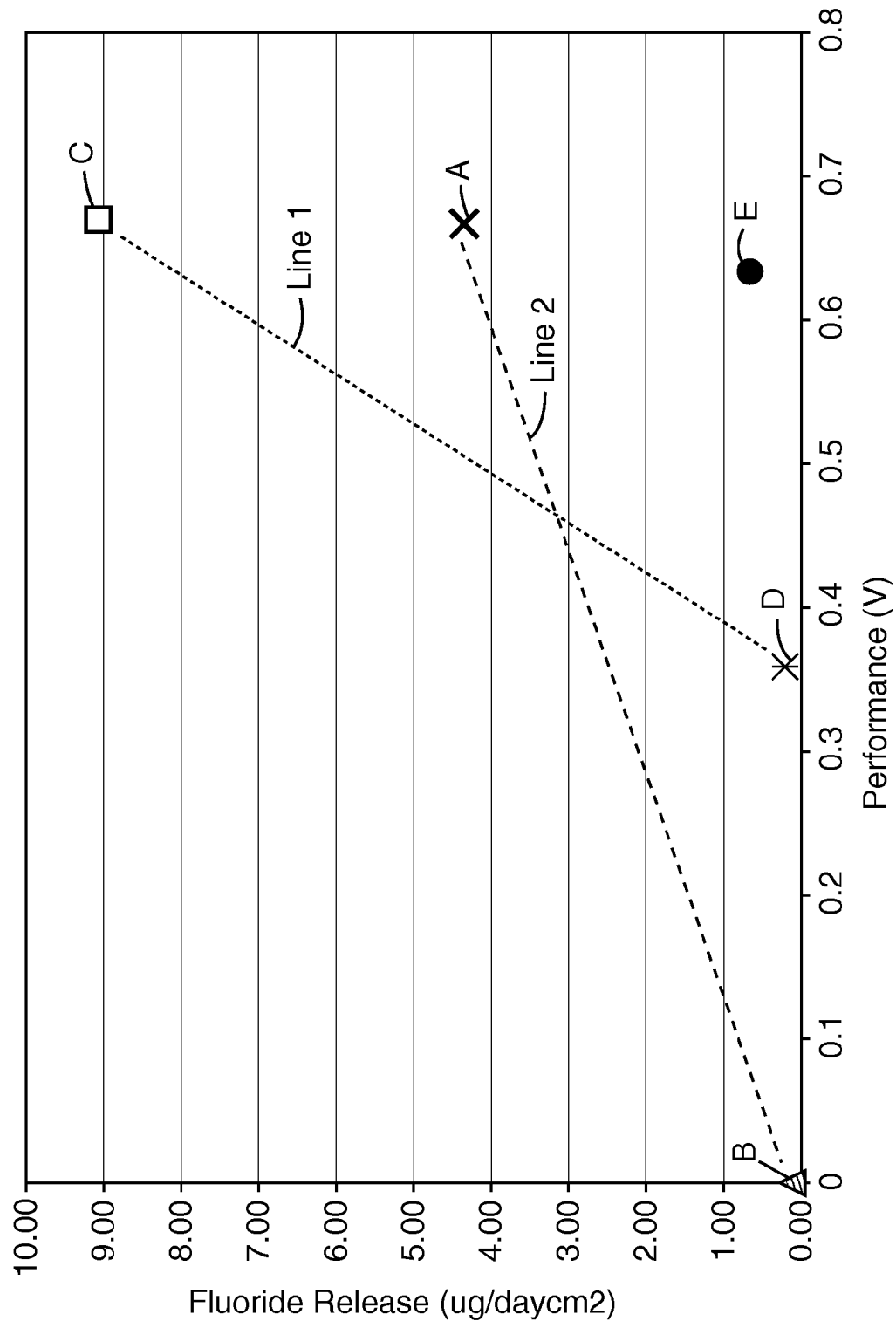

DURABLE FUEL CELL MEMBRANE ELECTRODE ASSEMBLY WITH COMBINED ADDITIVES

CROSS REFERENCE TO RELATED APPLICATION

This application claims the benefit of U.S. Provisional Patent Application No. 61/017,027, filed Dec. 27, 2007, the disclosure of which is incorporated by reference herein in its entirety.

FIELD OF THE DISCLOSURE

This disclosure relates to fuel cell membrane electrode assemblies (MEA's) with highly improved durability and performance. The MEA's of the present disclosure include one or more electrodes which include one or more cerium oxides and polymer electrolyte membranes (PEM's) which include one or more manganese cations or manganese compounds.

BACKGROUND OF THE DISCLOSURE

U.S. Pat. App. Pub. Nos. 2006/0063054 A1 and 2006/0063055 A1 and U.S. patent application Ser. Nos. 11/261,053, 11/262,268 and 11/962,971, incorporated herein by reference, address the use of cerium or manganese additives to improve durability of polymer electrolyte membranes (PEM's).

SUMMARY OF THE INVENTION

Briefly, the present disclosure provides a fuel cell membrane electrode assembly comprising a polymer electrolyte membrane comprising a first polymer electrolyte and at least one manganese cation or manganese compound; and one or more electrode layers comprising a catalyst and at least one cerium compound. In some embodiments, the first polymer electrolyte comprises bound anionic functional groups, at least a portion of said anionic functional groups are in acid form and at least a portion of said anionic functional groups are neutralized by manganese cations. In some embodiments, the distribution of manganese throughout the polymer electrolyte membrane is uniform. In some embodiments the manganese cations are $Mn^{2+}$ cations. The one or more electrode layers may additionally comprise a second polymer electrolyte. The first polymer electrolyte, second polymer electrolyte or both may optionally be highly fluorinated or perfluorinated. The first polymer electrolyte and the second polymer electrolyte may have the same or different composition. The first polymer electrolyte and the second polymer electrolyte may have the same or different equivalent weight. The first polymer electrolyte and the second polymer electrolyte may have the same or different molecular weight. In some embodiments the amount of manganese cations present is between 0.001 and 0.5 charge equivalents based on the molar amount of anionic functional groups present in the first polymer electrolyte, and in some embodiments between 0.01 and 0.1 charge equivalents. In some embodiments the first polymer electrolyte has an equivalent weight of 1050 or less, in some embodiments 1000 or less, in some embodiments 950 or less, in some embodiments 900 or less, in some embodiments 850 or less, and in some embodiments 800 or less. In some embodiments the first polymer electrolyte comprises pendent groups according to the formula: —O—$CF_2$—$CF_2$—$CF_2$—$CF_2$—$SO_3H$. In some embodiments the MEA additionally comprises a porous support. In some embodiments the one or more electrode layers comprise cerium compounds in an amount of between 0.01 and 5 percent by weight relative to the weight of catalyst, more typically between 0.1 and 1.0 percent by weight. In some embodiments the cerium compound is a cerium oxide compound. In some embodiments the cerium oxide compound is $CeO_2$. In some embodiments the cerium oxide compound is $Ce_2O_3$.

What has not been described in the art, and is provided by the present invention, is a fuel cell membrane electrode assembly comprising a specific combination of additives, including specificity of location and chemical form, which provides an unprecedented and unexpected combination of performance and durability.

In this application:

"uniform" distribution of an additive in a polymer membrane means that the amount of additive present does not vary more than +/−90%, more typically not more than +/−50% and more typically not more than +/−20%;

"equivalent weight" (EW) of a polymer means the weight of polymer which will neutralize one equivalent of base;

"polyvalent cation" means a cation having a charge of 2+ or greater;

"highly fluorinated" means containing fluorine in an amount of 40 wt % or more, typically 50 wt % or more and more typically 60 wt % or more; and "acid form" means, with regard to an anionic functional group, that it is neutralized by a proton.

It is an advantage of the present invention to provide a fuel cell membrane electrode assembly demonstrating both high performance and high durability.

BRIEF DESCRIPTION OF THE DRAWING

FIG. 1 is a graph of fuel cell performance (voltage) vs. fluoride release (a measure of durability) for Comparative MEA's A, B, C and D and a fuel cell membrane assembly according to the present disclosure, MEA E, as described further in the Examples.

DETAILED DESCRIPTION

The present disclosure provides membrane electrode assemblies (MEA's) with exceptionally high durability, particularly under hot and dry conditions, that is conditions above 80° C. and/or below 75% RH. The MEA's of the present disclosure include one or more electrodes which include one or more cerium oxides, typically present as dispersed particles, and in some embodiments, PEM's which include one or more manganese salts.

A membrane electrode assembly (MEA) or polymer electrolyte membrane (PEM) according to the present disclosure may be useful in an electrochemical cell such as a fuel cell. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes H$^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA. The terms "electrode layer" and "catalyst layer" are used interchangeably as used herein.

The PEM according to the present disclosure may comprise any suitable polymer electrolyte. The polymer electrolytes useful in the present disclosure typically bear anionic functional groups bound to a common backbone, which are typically sulfonate groups (forming sulfonic acid groups when neutralized by protons) but may also include carboxylate groups (forming carboxylic acid groups when neutralized by protons), deprotonated imide groups, deprotonated sulfonamide groups, and deprotonated amide groups, or other functional groups that form acids with protonated. The polymer electrolytes useful in the present disclosure typically are highly fluorinated and most typically perfluorinated. The polymer electrolytes useful in the present disclosure are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2$—$CF_2CF_2CF_2CF_2$—O—$CF$=$CF_2$, described in U.S. patent application Ser. Nos. 10/322,254, 10/322,226 and 10/325,278, which are incorporated herein by reference. The polymer typically has an equivalent weight (EW) of 1200 or less and more typically 1100 or less. In some embodiments, polymers of unusually low EW can be used, typically 1000 or less, more typically 900 or less, and more typically 800 or less, often with improved performance in comparison to the use of higher EW polymer.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. In some embodiments of the method according to the present disclosure, additives are added to the membrane only after annealing and not before, and therefore annealing conditions are not impacted by their presence, which may, e.g., raise membrane Tg, thus necessitating higher annealing temperatures. The PEM typically has a thickness of less than 50 microns, more typically less than 40 microns, more typically less than 30 microns, and most typically about 25 microns.

In some embodiments of the present disclosure, one or more manganese compounds are added to the polymer electrolyte of the PEM prior to, during or after membrane formation. In some embodiments of the present disclosure, one or more manganese salts are added to the polymer electrolyte of the PEM prior to, during or after membrane formation. In some embodiments, one or more manganese salts are added to a dispersion of the polymer electrolyte of the PEM prior to casting to form a membrane. In some embodiments, a membrane coated with or immersed in a solution of one or more manganese salts.

Manganese salts may comprise any suitable anion, including chloride, bromide, nitrate, carbonate and the like. Once cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Manganese cations may be in any suitable oxidation state, but are most typically $Mn^{2+}$. Without wishing to be bound by theory, it is believed that the manganese cations persist in the polymer electrolyte because they are exchanged with H$^+$ ions from the anion groups of the polymer electrolyte and become associated with those anion groups. Furthermore, it is believed that polyvalent manganese cations may form crosslinks between anion groups of the polymer electrolyte, further adding to the stability of the polymer. The amount of salt added is typically between 0.001 and 0.5 charge equivalents (of Manganese cations) based on the molar amount of anionic functional groups present in the polymer electrolyte, more typically between 0.005 and 0.2, more typically between 0.01 and 0.1, and more typically between 0.02 and 0.05.

In some embodiments of the present disclosure, a membrane electrode assembly comprises a polymer electrolyte membrane with bound anionic functional groups, wherein at least a portion of said anionic functional groups are in acid form and at least a portion of said anionic functional groups are neutralized by manganese cations. Examples of such manganese cations include $Mn^{2+}$, $Mn^{3+}$, $Mn^{4+}$, $Mn^{5+}$, and $Mn^{6+}$. In some preferred embodiments, the manganese cations are $Mn^{2+}$ cations. The portion of the anionic functional groups that are neutralized by manganese cations is typically between 0.001 and 0.5 charge equivalents based on the molar amount of anionic functional groups present in the polymer electrolyte, more typically between 0.005 and 0.2, more typically between 0.01 and 0.1, and more typically between 0.02 and 0.05.

A PEM according to the present disclosure may additionally comprise a porous support, such as a layer of expanded PTFE or the like, where the pores of the porous support contain the polymer electrolyte. A PEM according to the present disclosure may comprise no porous support. A PEM according to the present disclosure may comprise a crosslinked polymer.

To make an MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Any suitable catalyst may be used in the practice of the present disclosure. Typically, carbon-supported catalyst particles are used. Typical carbon-supported catalyst particles are 50-90% carbon and 10-50% catalyst metal by weight, the catalyst metal typically comprising Pt for the cathode and anode. In some embodiments, the catalyst metal comprises Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

In some embodiments of the present disclosure, one or more cerium compounds are added to one or both of the anode or cathode catalyst layers of the MEA, prior to, during or after formation of the electrode layer. In some embodiments of the present disclosure, one or more cerium oxide compounds are added to one or both of the anode or cathode catalyst layers of the MEA, prior to, during or after formation of the electrode layer.

Cerium oxide compounds may be crystalline or amorphous. The cerium oxide compound may contain cerium in the (IV) oxidation state, the (III) oxidation state, or both. In one embodiment, the cerium oxide compound is substantially free of metallic cerium. Alternately, the cerium oxide compound may contain both cerium oxide and metallic cerium. Essentially pure cerium (IV) oxide is represented by the chemical formula $CeO_2$. Essentially pure cerium (III) oxide is represented by the chemical formula $Ce_2O_3$. Alternately, the cerium oxide compound may be supported as a thin oxidation reaction product layer on a metallic cerium particle. In one embodiment, the cerium oxide compound may contain substantially no other metal elements. Alternately, the cerium oxide compound may contain one or more other metal elements and thus may be considered a mixed metal oxide compound comprising cerium oxide. Examples of mixed metal oxide compounds comprising cerium oxide include solid solutions such as zirconia-ceria and multicomponent oxide compounds such as barium cerate. "Cerium oxides" and "cerium oxide compounds" are used interchangeably herein and include to the aforementioned substances. The amount of cerium oxide present in the electrode layer is not limited, except to the extent that large additions can interfere with the electrochemical performance of the electrode. The amount of cerium oxide compound added is typically between 0.01 and 5 weight percent based on the total weight of the supported catalyst in the electrode layer, more typically between 0.1 and 2 wt %, and more typically between 0.2 and 1.3 wt %. The cerium oxide compound is typically present in an amount of less than 1% by volume relative to the total volume of the polymer electrolyte in the electrode layer, more typically less than 0.8% by volume, and more typically less than 0.5% by volume. Cerium oxide may be in the form of particles of any suitable size, typically between 1 and 5000 nm. In some embodiments, particle sizes of 200-5000 nm are preferred. In some embodiments, particle sizes of 500-1000 nm are preferred. Other useful cerium compounds include cerium salts and cerium metalorganic compounds, including cerium carboxylates, as well as mixed-metal analogues that include cerium. Examples of other useful cerium compounds include cerium acetate, cerium nitrate, cerium sulfate, and cerium phosphate.

In some embodiments, the membrane electrode assembly according to the present disclosure contains at least one manganese cation or compound in the polymer electrolyte membrane and at least one cerium compound in one or more electrode layers. In some embodiments, the membrane electrode assembly according to the present disclosure contains manganese cations in the polymer electrolyte membrane and at least one cerium compound in one or more electrode layers. In some embodiments, the membrane electrode assembly according to the present disclosure contains a polymer electrolyte membrane comprising a polymer electrolyte with bound anionic functional groups wherein a portion of said groups are in acid form and a portion are neutralized by manganese cations, the membrane electrode assembly also containing at least one cerium compound in one or more electrode layers. In some embodiments, the membrane electrode assembly according to the present disclosure contains at least one manganese compound in the polymer electrolyte membrane and cerium oxide compounds in one or more electrode layers. In some embodiments, the membrane electrode assembly according to the present disclosure contains manganese cations in the polymer electrolyte membrane and at least one cerium oxide compound in one or more electrode layers. In some embodiments, the membrane electrode assembly according to the present disclosure contains a polymer electrolyte membrane comprising a polymer electrolyte with bound anionic functional groups wherein a portion of said groups are in acid form and a portion are neutralized by manganese cations, the membrane electrode assembly also containing at least one cerium oxide compound in one or more electrode layers. In some embodiments, the membrane electrode assembly according to the present disclosure contains $Mn^{2+}$ cations in the polymer electrolyte membrane and $CeO_2$ in one or more electrode layers. In some embodiments, the membrane electrode assembly according to the present disclosure contains a polymer electrolyte membrane comprising a polymer electrolyte with bound anionic functional groups wherein a portion of said groups are in acid form and a portion are neutralized by manganese cations, the membrane electrode assembly also containing $CeO_2$ in one or more electrode layers. In some embodiments, the membrane electrode assembly according to the present disclosure contains $Mn^{2+}$ cations in the polymer electrolyte membrane and $Ce_2O_3$ in one or more electrode layers. In some embodiments, the membrane electrode assembly according to the present disclosure contains a polymer electrolyte membrane comprising a polymer electrolyte with bound anionic functional groups wherein a portion of said groups are in acid form and a portion are neutralized by manganese cations, the membrane electrode assembly also containing $Ce_2O_3$ in one or more electrode layers. In some embodiments, the membrane electrode assembly contains at least 50% less cerium in the PEM than in the electrodes. In some embodiments, the membrane electrode assembly contains at least 90% less cerium in the PEM than in the electrodes. In some embodiments, the membrane electrode assembly contains at least 95% less cerium in the PEM than in the electrodes. In some embodiments, the membrane electrode assembly contains at least 99% less cerium in the PEM than in the electrodes. In some embodiments, the membrane electrode assembly contains no cerium in the PEM. In some embodiments, the membrane electrode assembly contains at least 50% less manganese in the electrodes than in the PEM. In some embodiments, the membrane electrode assembly contains at least 90% less manganese in the electrodes than in the PEM. In some embodiments, the membrane electrode assembly contains at least 95% less manganese in the electrodes than in the PEM.

In some embodiments, the membrane electrode assembly contains at least 99% less manganese in the electrodes than in the PEM. In some embodiments, the membrane electrode assembly contains no manganese in the electrodes.

In some embodiments, the membrane electrode assembly according to the present disclosure contains a polymer electrolyte membrane comprising a polymer electrolyte with bound anionic functional groups wherein a portion of said groups are in acid form and wherein between 0.001 an 0.5 charge equivalents of said groups are neutralized by manganese cations, the membrane electrode assembly also containing 0.01 and 5 weight percent $CeO_2$ in one or more electrode layers based on the total weight of the supported catalyst in the electrode layer or layers. In some embodiments, the membrane electrode assembly according to the present disclosure contains a polymer electrolyte membrane comprising a polymer electrolyte with bound anionic functional groups wherein a portion of said groups are in acid form and wherein between 0.01 an 0.1 charge equivalents of said groups are neutralized by manganese cations, the membrane electrode assembly also containing 0.1 and 2 weight percent $CeO_2$ in one or more electrode layers based on the total weight of the supported catalyst in the electrode layer or layers.

To make an MEA, GDL's may be applied to either side of a CCM by any suitable means. Any suitable GDL may be used in the practice of the present disclosure. Typically the GDL is comprised of sheet material comprising carbon fibers. Typically the GDL is a carbon fiber construction selected from woven and non-woven carbon fiber constructions. Carbon fiber constructions which may be useful in the practice of the present disclosure may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In use, the MEA according to the present disclosure is typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

This disclosure is useful in the manufacture and operation of fuel cells.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

Four types of Comparative MEA (A, B, C and D) and one MEA of the present disclosure (E) were made. FIG. 1 is a graph of fuel cell performance (voltage) vs. fluoride release (a measure of durability) for Comparative MEA's A, B, C and D and a fuel cell membrane assembly according to the present disclosure, MEA E. Results reported for Comparative Example C represent the average result for 2 MEA's.

TABLE I

| MEA | PEM | Membrane Additive | Electrode Additive | Fluoride release ($\mu g/daycm^2$) | Performance (V) |
|---|---|---|---|---|---|
| A (Comparative) | 3M Ionomer | $Mn(NO_3)_2$ 3.5% | none | 4.35 | 0.667 |
| B (Comparative) | 3M Ionomer | $Mn(NO_3)_2$ Saturated | none | 0.11 | 0 |
| C (Comparative) | Nafion | none | 1% $CeO_2$ | 9.07 | 0.67 |
| D (Comparative) | Nafion | none | 10% $CeO_2$ | 0.21 | 0.359 |
| E | 3M Ionomer | $Mn(NO_3)_2$ 3.5% | 1% $CeO_2$ | 0.66 | 0.634 |

Membranes

The polymer electrolyte membranes (PEM's) used in the Example and Comparative Examples were, as noted in Table I, one of: a) 25 micron thick membranes cast from Nafion® SE 2009 solution (DuPont Chemicals, Wilmington Del.), reported equivalent weight (EW) 920, or b) 20 micron thick membranes cast from 3M Ionomer, which was a copolymer of tetrafluoroethylene (TFE) and $FSO_2—CF_2CF_2CF_2CF_2—O—CF=CF_2$ (Comonomer A). Comonomer A was made according to the procedures disclosed in U.S. patent application Ser. Nos. 10/322,254 and 10/322,226, incorporated herein by reference. Polymerization was performed by aqueous emulsion polymerization as described in U.S. patent application Ser. No. 10/325,278. The equivalent weight (EW) was 800. The ionomer was provided in a casting solution containing 16.7% solids in 70:30 n-propanol/water.

Membranes were cast from solution as disclosed in U.S. Pat. App. Pub. Nos. 2006/0063054 A1 and 2006/0063055 A1 and U.S. patent application Ser. Nos. 11/261,053, 11/262,268, the disclosures of which are incorporated herein by reference. Membranes were cast at a wet thickness of about 400 to 500 microns, onto a substrate of either PET (polyethylene terphthalate) or Kapton (polyimide). These castings were dried at 80-100° C., and then annealed at 160-200° C. for about 3 to 5 minutes. After cooling, the membranes were peeled form the liner and used without further purification. For MEA E and Comparative MEA A, $Mn(NO_3)_2$ was added to the casting solution in an amount equal to 0.035 charge equivalents based on the molar amount of anionic functional groups present in the polymer electrolyte. For Comparative MEA B, the membrane was soaked in $Mn(NO_3)_2$ solution after casting to produce a membrane completely saturated in $Mn(NO_3)_2$.

Membrane Electrode Assemblies (MEA's)

MEA's having 50 $cm^2$ of active area were made from membranes as disclosed in U.S. Pat. App. Pub. Nos. 2006/0063054 A1 and 2006/0063055 A1 and U.S. patent application Ser. Nos. 11/261,053, 11/262,268, the disclosures of which are incorporated herein by reference. Catalyst dispersions were prepared according to the method described in WO 2002/061,871, incorporated herein by reference. For MEA E and Comparative MEA C, $CeO_2$ was added to the catalyst dispersion in an amount that was 1% by weight of the amount of supported catalyst. For Comparative MEA D, $CeO_2$ was added to the catalyst dispersion in an amount that was 10% by weight of the amount of catalyst. To prepare catalyst-coated membranes, anode and cathode layers were applied to membranes according to the decal transfer method described in WO 2002/061,871. The catalyst loading was 0.6 $mg/cm^2$ on both anode and cathode for all MEA's. Where $CeO_2$ was added to the electrodes, it was added to both anode and cathode. PTFE-treated carbon paper gas diffusion layers and polytetrafluoroethylene/glass composite gaskets were applied to the CCM by pressing in a Carver Press (Fred Carver Co., Wabash, Ind.) with 13.4 kN of force at 132° C. for 10 minutes to complete the MEA's.

Performance Test

All MEA's were tested in a test station with independent controls of gas flow, pressure, relative humidity, and current or voltage (Fuel Cell Technologies, Albuquerque, N. Mex.). The test fixture included graphite current collector plates with quad-serpentine flow fields. Samples were conditioned overnight and subsequently tested in an air utilization test wherein performance is measured as cathode stoichiometry is gradually reduced. Performance at the lowest air stoichiometry, 1.3 in this case, is taken as a measure for how well the catalyst and membrane perform together. The performance metric is the measured voltage at 0.6 $A/cm^2$ at the following conditions: $H_2$/Air flow rates 600/994 sccm (1.3 stoichiometry on cathode) 0/0 PSIG, Cell Temperature=70° C., Inlet Dew Points 70/70° C. (100/100% RH), Current held constant at 0.6 $A/cm^2$. The measured voltages for MEA E and Comparative MEA's A, B C, and D are reported in Table 1 and plotted in FIG. 1.

Fluoride Release Test

Fluoride release is measured as an indication of durability, with low fluoride release correlating with high durability.

After the performance metric was measured, MEA's were run under the following conditions: $H_2$/Air flow rates 657/1657 sccm, 7.25/7.25 PSIG, Cell Temperature=95° C., Inlet Dew Points 77.1/77.1° C. (60/50% RH), Continually scan OCV until OCV drops below 800 mV. Effluent water was collected daily until samples failed and fluoride content of the effluent water was measured with an ion chromatograph. The average daily fluoride release over the lifetime of the sample was calculated for MEA E and Comparative MEA's A, B C, and D and are reported in Table 1 and plotted in FIG. 1.

Evaluation

Performance and fluoride release data for MEA E and Comparative MEA's A, B C, and D are plotted in FIG. 1. Line 1 connects data points for Comparative MEA's C and D, which were made with $CeO_2$ electrode additive. Line 2 connects data points for Comparative MEA's A and B, which were made with manganese PEM additive. It can be readily seen in FIG. 1 that excess addition of either additive improves fluoride release results at the expense of performance. However, MEA E simultaneously demonstrates both low fluoride release and high performance. The results for MEA E are beyond any that would be expected on the basis of the results obtained with MEA's A, B C, and D.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A fuel cell membrane electrode assembly comprising:
   a) a polymer electrolyte membrane comprising a first polymer electrolyte and at least one manganese cation, wherein the distribution of manganese cations across the thickness of the polymer electrolyte membrane is uniform, and wherein the distribution of manganese cations throughout the polymer electrolyte membrane is uniform; and
   b) one or more electrode layers comprising a catalyst and at least one compound containing cerium and oxygen, wherein a total amount of compounds containing cerium and oxygen is between 0.1 and 1.0 percent by weight relative to the weight of catalyst present.

2. The fuel cell membrane electrode assembly according to claim 1, wherein the first polymer electrolyte comprises bound anionic functional groups, wherein at least a portion of said anionic functional groups are in acid form and at least a portion of said anionic functional groups are neutralized by manganese cations.

3. The polymer electrolyte membrane according to claim 2 where said cations are $Mn^{2+}$ cations.

4. The fuel cell membrane electrode assembly according to claim 1 wherein the first polymer electrolyte is highly fluorinated.

5. The fuel cell membrane electrode assembly according to claim 1 wherein the first polymer electrolyte is perfluorinated.

6. The fuel cell membrane electrode assembly according to claim 1 wherein the one or more electrode layers additionally comprise a second polymer electrolyte.

7. The fuel cell membrane electrode assembly according to claim 6 wherein the second polymer electrolyte is highly fluorinated.

8. The fuel cell membrane electrode assembly according to claim 6 wherein the second polymer electrolyte is perfluorinated.

9. The fuel cell membrane electrode assembly according to claim 2 where the amount of manganese cations present is between 0.001 and 0.5 charge equivalents based on the molar amount of anionic functional groups present in the first polymer electrolyte.

10. The fuel cell membrane electrode assembly according to claim 2 where the amount of manganese cations present is between 0.01 and 0.1 charge equivalents based on the molar amount of anionic functional groups present in the first polymer electrolyte.

11. The fuel cell membrane electrode assembly according to claim 1 wherein said first polymer electrolyte has an equivalent weight of 900 or less.

12. The fuel cell membrane electrode assembly according to claim 1 wherein said first polymer electrolyte comprises pendent groups according to the formula:

$$-O-CF_2-CF_2-CF_2-CF_2-SO_3H.$$

13. The fuel cell membrane electrode assembly according to claim 1 additionally comprising a porous support.

14. The fuel cell membrane electrode assembly according to claim 1 wherein said cerium oxide compounds are $CeO_2$.

15. The fuel cell membrane electrode assembly according to claim 1 wherein said cerium oxide compounds are $Ce_2O_3$.

16. The fuel cell membrane electrode assembly according to claim 1 which contains at least 50% less manganese in the electrode layer(s) than in the polymer electrolyte membrane and at least 50% less cerium in the polymer electrolyte membrane than in the electrode layer(s).

* * * * *